United States Patent [19]
Patton

[11] Patent Number: 4,698,543
[45] Date of Patent: Oct. 6, 1987

[54] ELECTRODE FOR ELECTRICAL DISCHARGE MACHINING

[75] Inventor: Roy D. Patton, Mooresville, N.C.

[73] Assignee: Colt Industries Inc., New York, N.Y.

[21] Appl. No.: 343,866

[22] Filed: Jan. 29, 1982

[51] Int. Cl.$^4$ .......................... H01J 1/00; H01J 17/04; H01J 19/00
[52] U.S. Cl. .................................................. 313/357
[58] Field of Search ............ 313/357; 219/69 C, 69 G

[56] References Cited

U.S. PATENT DOCUMENTS 3,727,024  4/1973  Bell, Jr. ............................ 219/69 G
3,854,206  12/1974  Bell, Jr. et al. .................... 219/69 C

OTHER PUBLICATIONS

Cyclopedia of Mechanical Engineering, H. M. Raymond, editor, 1908, vol. 1, pp. 42-44.

Primary Examiner—Robert E. Wise
Attorney, Agent, or Firm—Harry R. Dumont

[57] ABSTRACT

An electrical discharge machining electrode for small hole machining. The electrode is of a rod shape and includes a spiral shaped groove extending along the electrode body with a length greater than the thickness of the workpiece. The groove terminates proximate the electrode machining face for receiving a stream of liquid coolant and promoting its flow through the gap during machining. The electrode machining face is blunt and relatively planar in shape.

5 Claims, 6 Drawing Figures

ELECTRODE FOR ELECTRICAL DISCHARGE MACHINING

TECHNICAL FIELD

This invention relates to a small hole electrode for electrical discharge machining.

BACKGROUND ART

The field to which this invention relates is that known as electrical discharge machining, hereinafter sometimes referred to as EDM, in which material is removed from an electrically conductive workpiece by the action of electrical gap discharges passing between a tool electrode and the workpiece. A dielectric liquid coolant is circulated through the machining gap maintained between the tool and workpiece during machining operation. A servo feed system is included to provide for relative movement between the workpiece and electrodes to maintain an optimum gap spacing as the workpiece material is progressively removed. In the EDM operation, the electrode is always maintained in spaced relationship with the workpiece. There is no physical contact between the two during normal machining operation.

In order to conduct electrical discharge machining with reliable and predictable results, an electrical discharge machining circuit of the independent pulse generator type is preferably used to provide machining power pulses of precisely controllable frequency and on/off time. In this particular type of EDM circuit, the pulse generator may be embodied as a multivibrator oscillator or the like. One type of pulse generator suitable for use in conjunction with this invention is shown and described in U.S. Pat. No. 3,854,026 issued on Dec. 4, 1974 to Oliver A. Bell, Jr. et al. for "Gated Timing System for Electrical Discharge Machining", which patent is of commonn ownership with the present application.

A servo feed system for electrical discharge machining is shown and described in U.S. Pat. No. 3,727,024 issued on Apr. 10, 1973 to Oliver A. Bell for "Electrical Discharge Machining Servo Control Circuit" also of common ownership herewith.

DISCLOSURE OF THE INVENTION

The present invention is particularly important for use in machining by EDM of a small hole that is 0.030 inches or smaller in diameter. With electrodes of this size it is not possible to provide a through hole for flushing by a channel extending through the electrode as is possible for larger electrodes. In the absence of a through hole and when flushing is not adequate, it is possible to penetrate to a depth of 0.050-0.060 inches about which point the electrode will begin to coat with carbon ad metal particles. The machining action will slow down until it actually ceases. Current will be passed through the carbon build-up which normally will continue to grow until finally the cutting operation ceases, generally far short of the depth to which it is desired.

In machining with a small solid electrode, rigidity is also desired to maintain accuracy. Flushing by directing a stream of coolant at opposite sides of the electrode is appropriate for larger electrodes but does not serve the purpose when the electrode is small and rod shaped.

The present invention provides an electrode with a spiral shaped slot in it which promotes continuation of the spark machining process and allows the clearance of swarf together with the created gas as the cutting continues. It is thus possible to cut through to far deeper depths or to make holes that extend all the way through the workpiece. Not only electrode wear but cutting time can be substantially reduced.

It is thus an object to provide improved small hole operations by EDM. This object and other objects and advantages of the invention will become more readily apparent from the following detailed description when taken in conjunction with the accompanying drawings.

BRIEF DESCRIPTION OF THE DRAWINGS

Reference is made to the appended specification which explains the present invention to the drawings in which like numerals and letters are used to refer to like elements which are shown throughout the several drawings, and wherein.

BEST MODE OF CARRYING OUT THE INVENTION

Figure 1:
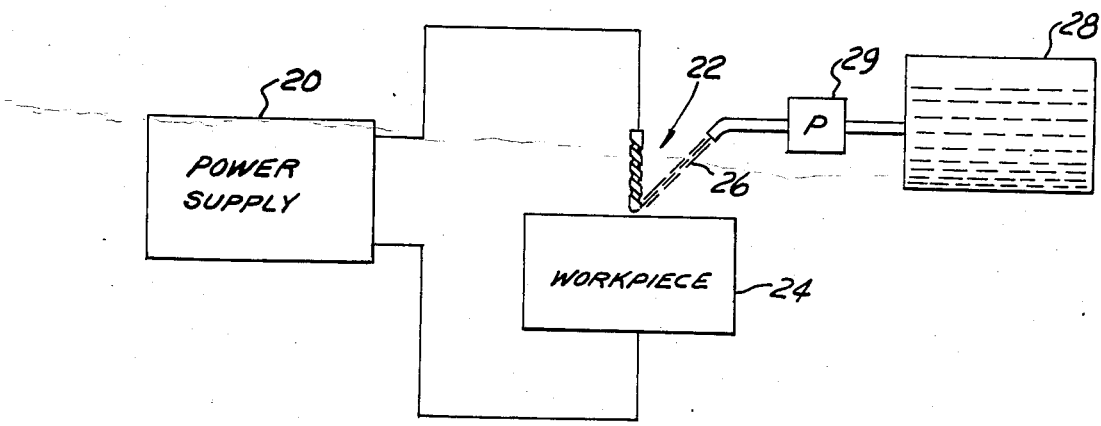
FIG. 1 is a schematic and block diagrammatic showing of an EDM machining setup.

FIG. 1 shows a power supply 20, which is of a type disclosed in the aforedsaid U.S. Pat. No. 3,854,026, having its output leads connected to an electrode 22 and a workpiece 24 for providing through-hole cutting. A stream of dielectric fluid 26 is provided under pressure from a reservoir 28 by a pump 29 in a manner well known in the EDM art. As shown in FIG. 1, the stream of dielectric 26 is directed at the side of the electrode 22 and it runs downwardly and through the gap existing between the lower end of electrode 22 and the upper surface of the workpiece 24.

Figure 2:
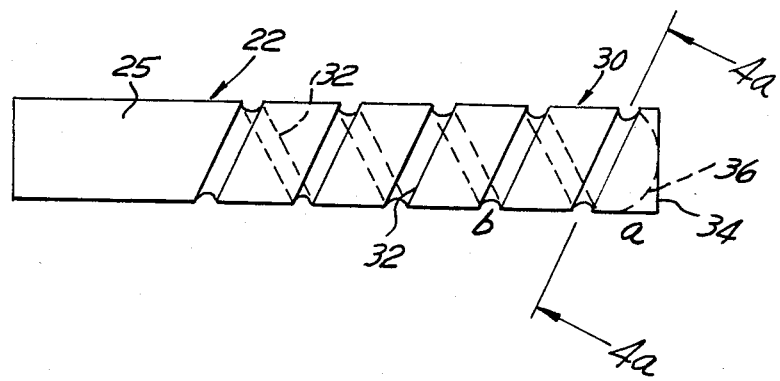
FIG. 2 is a side elevational view to enlarged scale of an electrode according to the present invention.

FIG. 2 shows the electrode 22 with it shank 25 and cutting end 30. The electrode 22 may be formed from a variety of materials of the electrically conductive type. Commonly used electrode materials are brass, copper, copper tungsten, carbide, graphite and copper graphite. A major problem encountered in the use of all these electrode materials is the carbon and steel build-up which results in loss of the electrical conducting ability as has previously been mentioned.

The cutting end 30 of the electrode includes a spiral groove 32 that extends along a substantial length of the electrode and terminates at its cutting surface 34. The manner in which the material at surface 34 is eroded during cutting is indicated by dash-line 36. As shown along line 36, the end becomes rounded off or oblong. In the absence of spiral groove 32 poor flushing results and machining action will finally stop as the opening depth becomes greater.

It has been found that the normal limits encountered for a solid electrode range between 0.050 and 0.070 inches without flushing at which time the machining action stops and or slows to an erratic machining cut. With the incorporation of the twist and spiral groove 32 it is possible to cut an opening in the workpiece three or four times deeper.

Figure 3A:
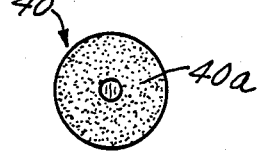
FIGS. 3a & 3b are fragmentary end and side views respectively of a solid electrode showing its wear characteristics.
Figure 3B:
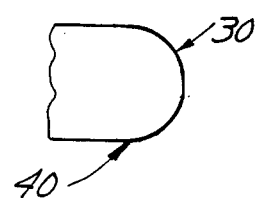

FIGS. 3a and 3b show the cutting end of a solid electrode 40 and the way in which an excessive wear area 40a is created around its cutting end 30 as best shown in FIG. 3a.

Figure 4A:
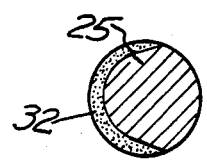
FIGS. 4a & 4b are sectional and side elevational views, respectively, with parts broken away showing an electrode constructed and grooved according to the present invention.
Figure 4B:
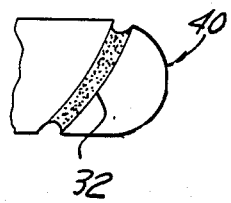

With the use of a grooved electrode such as shown in FIGS. 4a and 4b, the wear area is largely restricted as shown to the shaded groove 32 so that the remainder of the electrode retains its shape and thus the shape of the opening remains uniform. The spiral shaped groove extends along the electrode body with a length greater than the thickness of the workpiece.

It will thus be seen that I have provided by my invention an EDM small hole electrode which promotes greatly reduced electrode wear and with improved cutting time. It is also important that the improved electrode permits making of a round hole with a single electrode through a number of passes in the same or in different workpieces.

I claim:

1. An electrode for small hole cutting electrical discharge machining, comprising:

an elongated electrode of electrically conductive material, said electrode having a mounting shank at one end;

a spiral, groove portion extending along a substantial length of the electrode and terminating proximate its machining end for receiving a stream of coolant and providing its flow into and through the gap during cutting; and a blunt, relatively planar cutting surface at the other end of said electrode.

2. The improvement of claim 1 wherein, said electrode is of a substantially circular cross section.

3. The improvement of claim 1 wherein, said electrode comprises a copper alloy material.

4. The improvement of claim 1 wherein, said electrode is of a graphite base material.

5. An electrode for electrical discharge machining comprising a rod shaped electrode of electrically conductive material, said electrode having a mounting shank at one end and a blunt, relatively planar cutting surface at the other end; and a spiral groove portion extendng along a substantial portion of the electrode and terminating proximate its cutting surface end for receiving a stream of coolant and promoting its flow into and through a gap between the electrode and a workpiece during cutting.

* * * * *